May 15, 1945.  F. VICTORIA  2,376,020
COMBINED WINDMILL AND ELECTRIC GENERATOR
Filed May 26, 1944  4 Sheets-Sheet 1
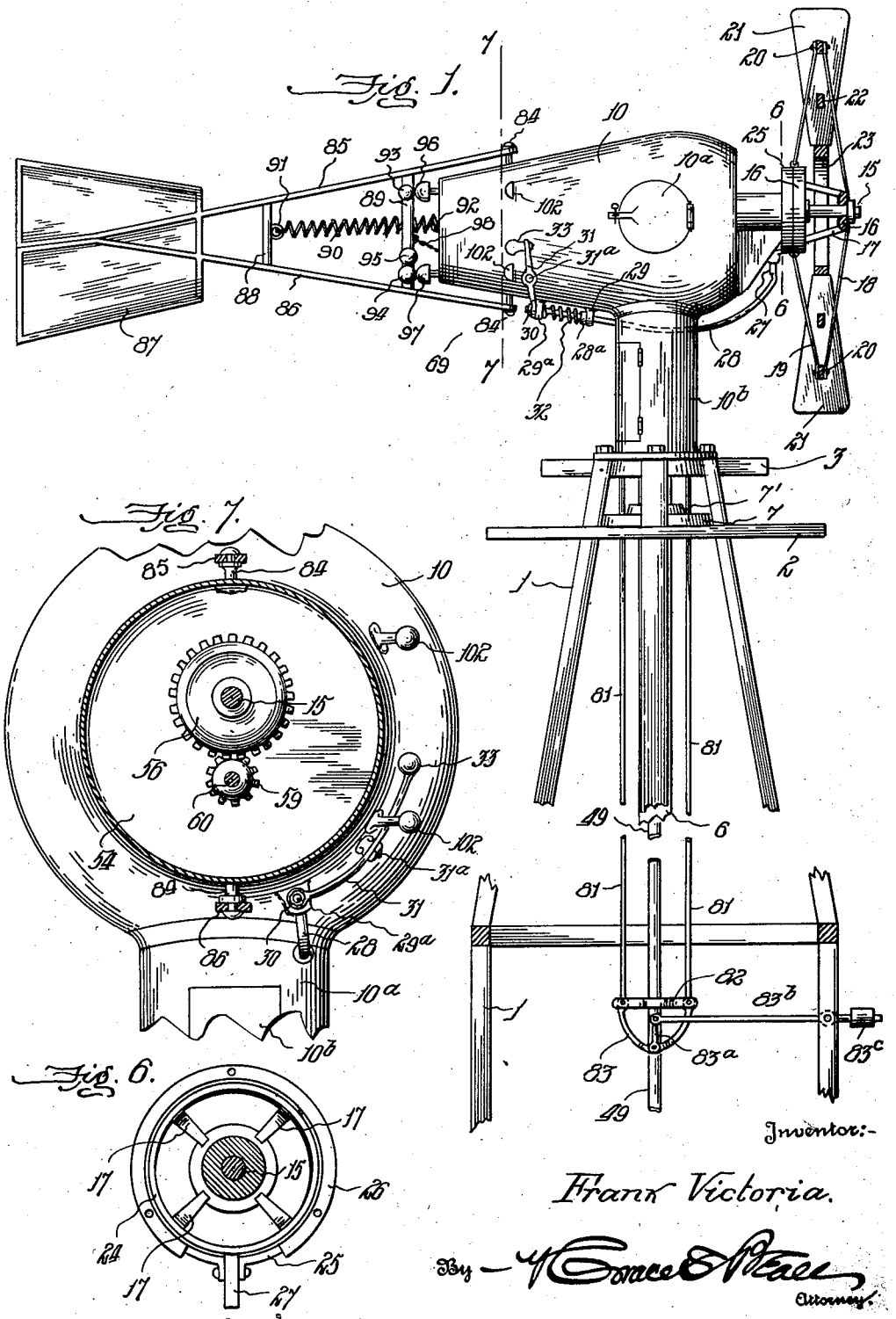
Inventor:-
Frank Victoria.

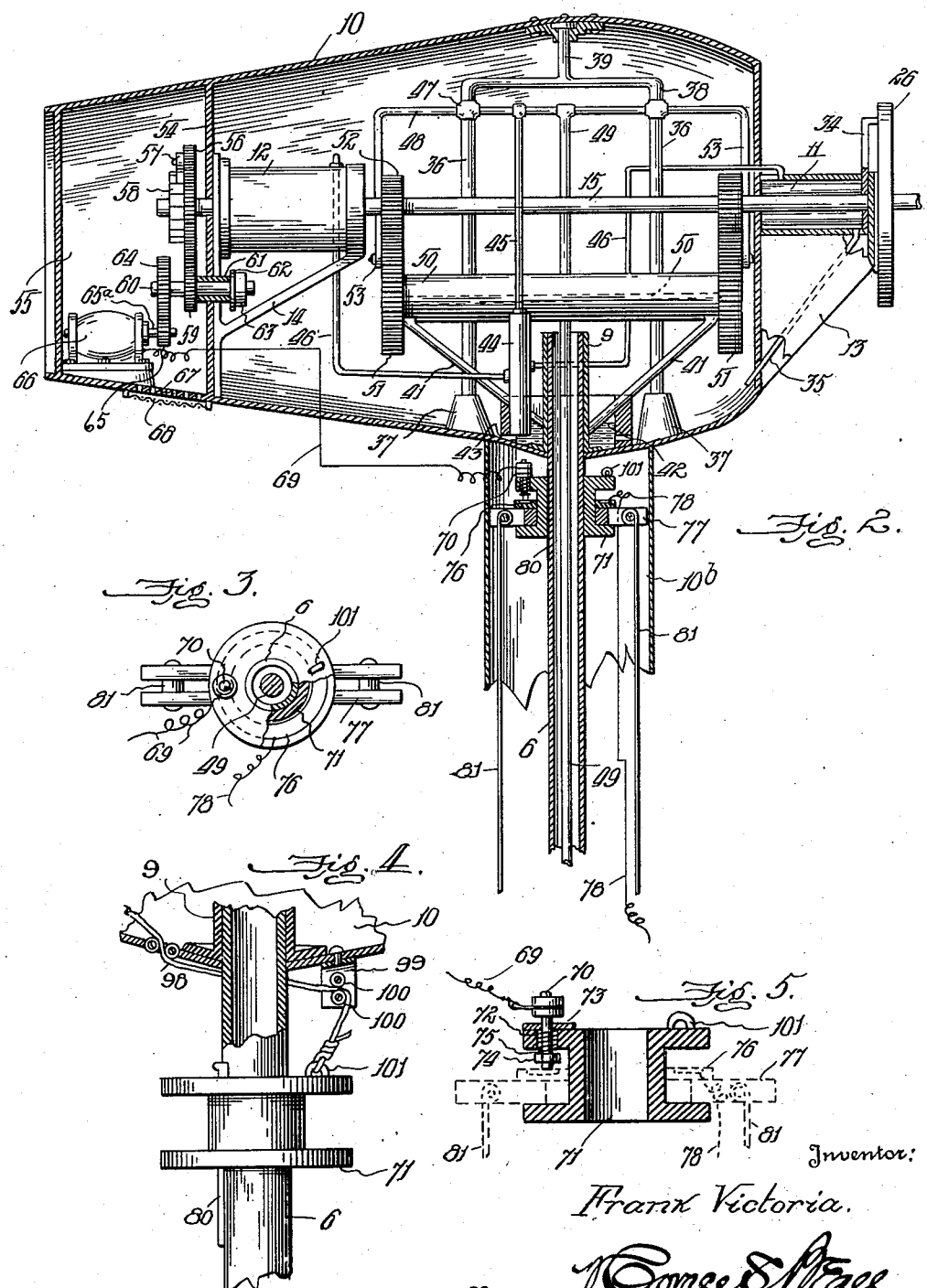

May 15, 1945. F. VICTORIA 2,376,020
COMBINED WINDMILL AND ELECTRIC GENERATOR
Filed May 26, 1944 4 Sheets-Sheet 4
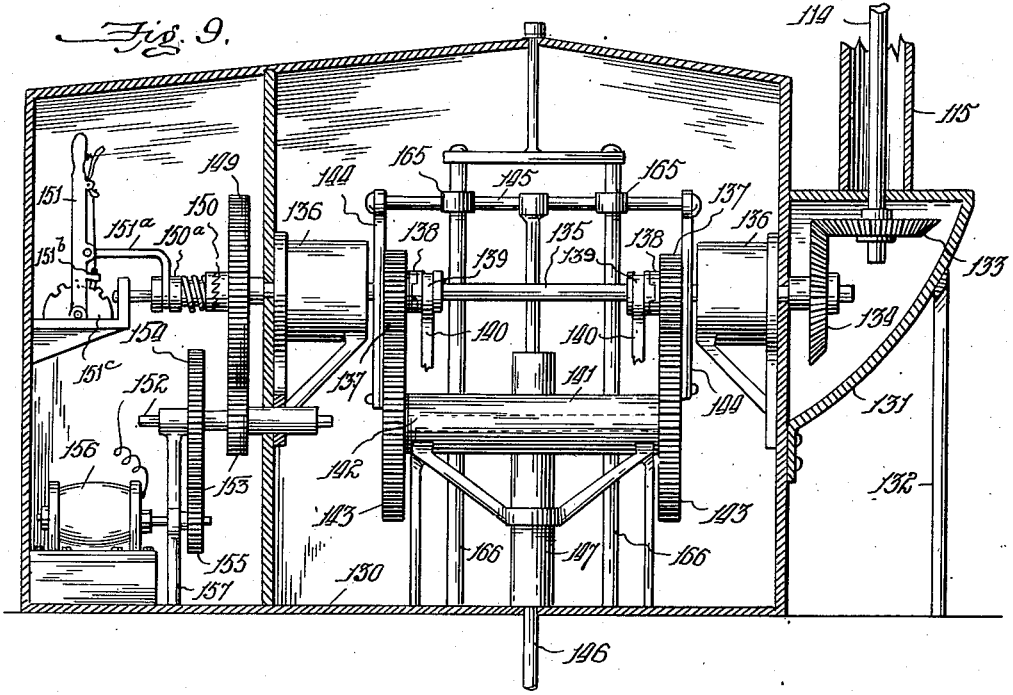
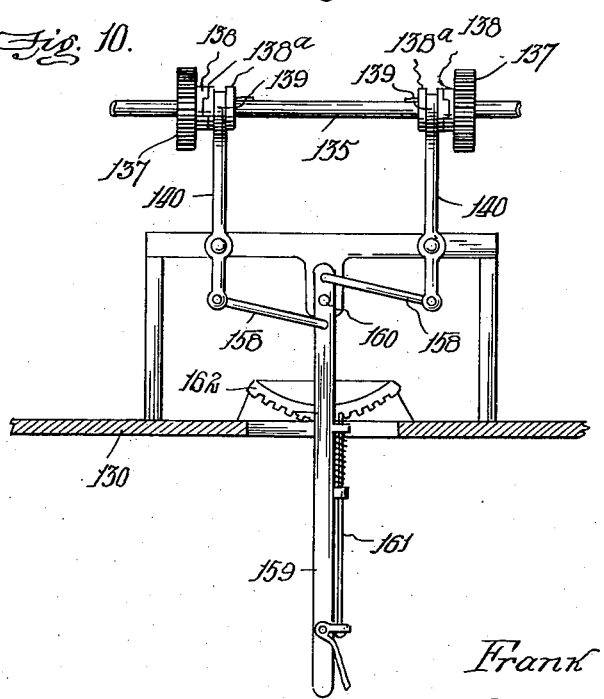
Inventor:
Frank Victoria
By
Attorney.

Patented May 15, 1945

2,376,020

UNITED STATES PATENT OFFICE 2,376,020

COMBINED WINDMILL AND ELECTRIC GENERATOR

Frank Victoria, Julesburg, Colo.

Application May 26, 1944, Serial No. 537,435

1 Claim. (Cl. 290—44)

My invention relates to that type of windmills or wind motors in which the power generated by the wind wheel is utilized for various purposes.

The principal object of my invention is to provide a wind motor of this character which may be used for pumping water and for generating an electric current of low voltage for lighting and illuminating purposes as well as for operating small machines as for instance churns, washing machines, saws, and the like.

A further object of the invention is to provide a combined wind motor of this character with means for pumping lubricating oil to the bearings of the mechanism employed in this instance for pumping water, and for generating electric current, including those of the main driving shaft which forms part of the windmill.

A further object of the invention is to provide a wind motor with means for closing the blades of the wind wheel from the force of the wind, either automatically or manually so that said wind wheel will be inoperative in a strong wind to prevent injury to the motor or parts operated thereby, or when it is desired to make repairs.

In the preferred form of my invention which provides particularly for the generation of electricity directly from the shaft of the wind wheel and contemplates special means for conducting the electricity from the tower, the electric generator and lubricating device as well as the wind wheel are carried by a casing or housing supported on a column or standard rotatable in the upper end of a tower, and in the modified form of my invention the lubricating device only is located in the housing at the upper end of the tower, while the generator and means for operating the well pump are enclosed in a casing or housing at the base of said tower, the main purpose of my invention being to provide an apparatus of this general character which will be compact in construction and effective in its operation, all as hereinafter fully described and specifically set forth in the appended claim.

In the accompanying drawings:

Figure 1 is a side elevation of the preferred form of the combined windmill and electric generator.

Fig. 2 is an enlarged vertical sectional view to show the mechanisms in the rotatable housing at the upper end of the tower.

Fig. 3 is a detail plan view of a special form of conductor carried by the rotatable column or standard supporting the housing.

Fig. 4 is a detail view of the means for manually operating the vane of the wind wheel.

Fig. 5 is an enlarged detail sectional view of the slidable collar which forms an electric conductor as well as part of the means for operating the vane of the wind wheel.

Fig. 6 is a sectional view on the line 6—6 of Fig. 1 to show the brake band mechanism.

Fig. 7 is a sectional view through the casing on the line 7—7 of Fig. 1, looking toward its forward end.

Fig. 9 is a similar view of the lower part of the structure used in conjunction with the housing and mechanism shown in Fig. 8, and Fig. 10 is a detail view of the clutch operating mechanism used in connection with the arrangement of operating mechanism for the pump and electric generator shown in Fig. 9.

Figure 8:
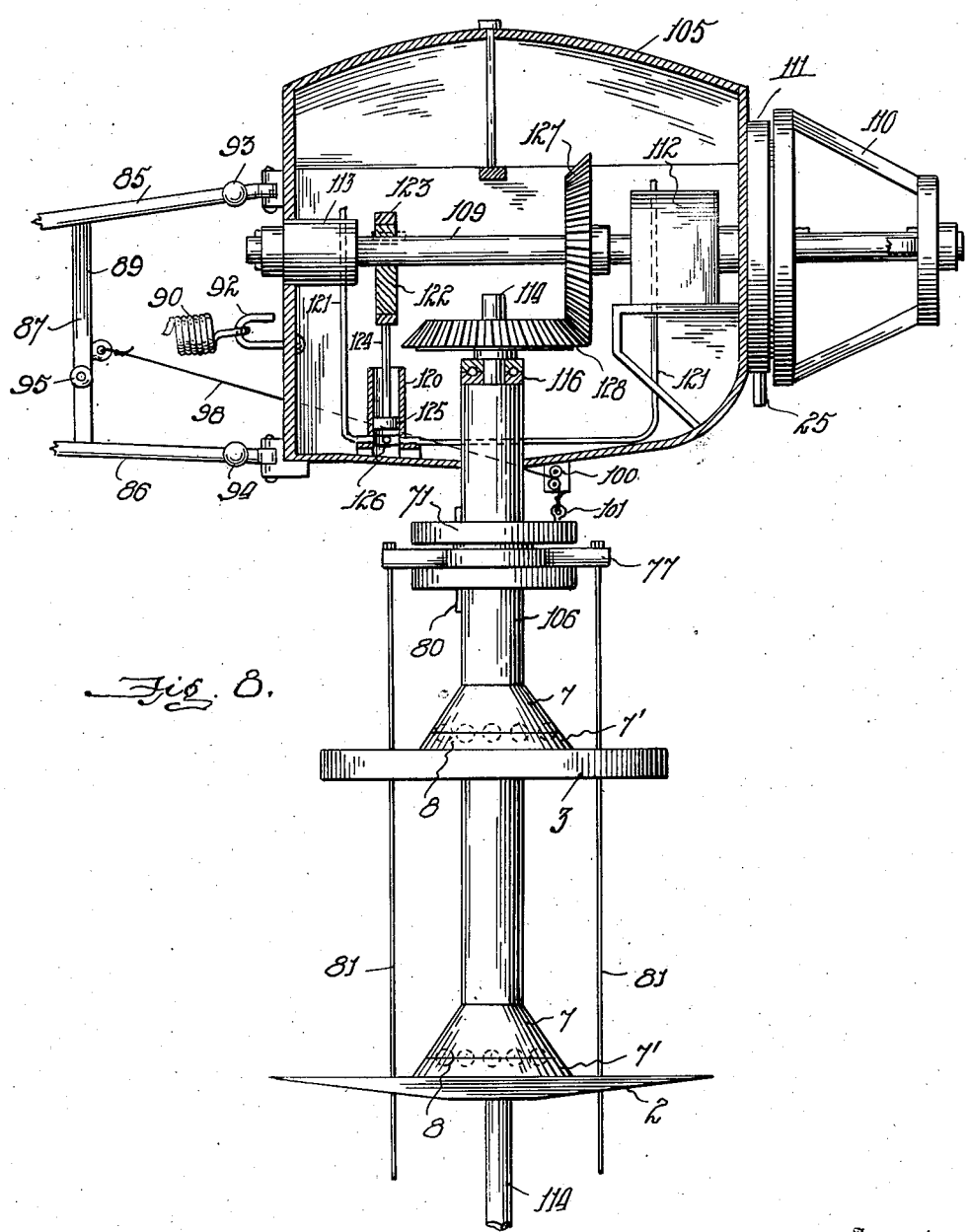
Fig. 8 is a vertical longitudinal sectional view of the upper part of the structure illustrating a modified form of the windmill and electric generator.

In the preferred form of my invention the pump mechanism and electric generator operated by the wind motor are enclosed within a casing or housing 10 suitably mounted on the upper end of a rotatable column or standard 6, preferably by means of a sleeve 9 projecting into the casing or housing and welded to said standard so that the housing will rotate therewith. The column or standard of the housing is supported in the upper portion of a tower 1 provided with spaced apart platforms on which are secured bearings 2, 3 cooperating with collars 7, 7' fixed on the standard for rotatably supporting it and the tower, and to reduce friction in the turning movement of the standard and housing supported thereby ball bearings 8 are employed as shown in Fig. 2. The casing or housing is in the form of the body of a bird, that is to say it tapers abruptly towards its forward end and gradually towards the rear, the main shaft 15 which is driven by the wind wheel passing horizontally through the center of this housing and journaled in roller bearings 11 and 12. The casing is provided with a vertical partition 54 in the longer tapered end from which is supported by bracket 14 a casing having the roller bearing 12 for the main shaft while the casing for the roller bearing 11 is supported by bracket 13 at the forward end of the housing. The wind wheel fixed to the forward end of the main shaft 15 comprises a skeleton hub and concentric rings 20, 22 and 23 to which the blades 21 are secured by wire spokes 18 extending from spaced apart disks 16, 16 to the outer ring 20, said disks being connected together by brace rods 17, and as will be noted by reference to Fig. 1 the inner concentric ring 23 is connected to the inner ends of the blades while the ring 22 extends through said blades intermediate the inner and outer rings 23 and 20, thus providing a wind wheel of light construction with the spaced apart blades disposed at an angle to the wind when the wind wheel is in operative position. For holding the wind wheel at rest, either automatically or by manual operation as hereinafter described, a brake is provided at the inner end of the hub consisting of a drum 24 fixed to the inner disk or wheel 16 of said hub with the brake band 25 retained in place by a rim flange 26 supported from the bracket 13 by angle bars 34 (Fig. 2), said brake band being connected at its ends to a bell crank lever 27 (Fig. 6) pivoted in a bearing on the bracket 13 at the forward end of the housing and operated by a rod 28 extending rearwardly at one side of the supporting standard 6 and passing loosely through a lug or guide bracket 29 on the housing to receive a helical spring 32 for normally holding the brake band released. The helical spring is interposed between a companion guide bracket 29a and a collar 28a fixed to the rod and bearing against the aforesaid bracket 29 when the spring is expanded in releasing the brake, and for operating the rod against the action of the spring in applying the brakes the lever 31 is fulcrumed on the housing at 31a and connected at its lower end to a head 30 at the outer end of the brake rod, while at its upper end said lever is provided with a projection or bumper 33 against which the supporting frame of the movable vane or tail of the wind wheel strikes in the operation of said lever.

In the present instance I utilize the power of the shaft 15 driven by the wind wheel in pumping water and for generating electric current; therefore for operating the pump there are spaced apart guide posts 36, 36 mounted on base supports 37 on the bottom of the housing to form guides for a vertical reciprocating crosshead 48 to which the upper end of the pump rod 49 is connected, said guide posts being braced at their upper ends by a crossbar 38 and vertical bar 39, the latter extending to the top of the housing. The crosshead 48 is provided with intermediate slides 47 working on the posts and at its opposite ends said crosshead is extended downwardly to provide pitman rods 53, 53 connected to pitman wheels 51 fixed to the ends of a horizontal shaft 50 mounted in a bearing 40 supported from the sleeve 9 by inclined bars 41, said pitman wheels being in the form of large gearwheels in mesh with pinions 52 keyed to the driving shaft 15, it being noted that the driving shaft and shaft carrying the pitman wheels are in vertical alignment and that the crosshead is at one side of the shaft 15 so that the latter will not interfere with the operation of the pitman rods which are each pivoted near the axes of the pitman wheels.

Oil is supplied to the bearings 11 and 12 by way of pipes 46, 46 extending from a pump 44 receiving oil from a well 42 surrounding the sleeve 9, the piston 45 of said pump being operated from the crosshead 48 to which it is connected as shown in Fig. 2, and in order that the oil deposited on the bottom of the housing may be returned to the oil-well the latter is provided with apertures 43 on a plane slightly below the lower or inlet end of the pump, oil from the bearing 11 being led to the bottom of the housing by a small conduit 35 extending through the bracket 13. As an ordinary form of force pump is employed an illustration in detail is unnecessary, and it will be understood of course that a fresh supply of oil will be placed in the well from time to time, and in order to gain access to the housing for this purpose, as well as to inspect and make repairs to the mechanism enclosed from the weather said housing is provided with a doorway 10a. Furthermore, it will be obvious that additional oil supply pipes from the pump may be led to the upper ends of the posts 36, 36 for lubricating the slides 47.

The partition wall 54 forms a compartment 55 at the rear end of the housing in which an electric generator 66 is located and is driven from the main driving shaft 15 by means of transmission gear comprising a ratchet wheel 58 keyed to said main shaft and engaged by a pawl 57 pivoted to and carried by a gearwheel 56 loosely mounted on the shaft alongside of said ratchet wheel and in mesh with a pinion 59 on a stub shaft 60 interposed between the main driving shaft and shaft 65a of the electric generator, the stub shaft being geared to the generator shaft by gearwheels 64 and 65. The stub shaft 60 is supported in a bearing box 61 extending through the partition wall 54, and is held in place or properly intermeshed with the companion gears by the gearwheel 59 at one end of said bearing box and a collar 63 at the other end thereof, the latter being keyed to the stub shaft by pin 62. It will be understood that the pawl carried by the gearwheel loosely mounted on the main shaft is engaged by the ratchet wheel fixed to said shaft when the latter is turned in one direction under the influence of the wind striking the blades of the wind wheel which operates said shaft, and that the pawl escapes over said ratchet wheel should the shaft be turned in the other direction. For the purpose of cooling the electric generator by atmospheric air the bottom of the compartment is provided with openings 67 protected by a screen 68, and for conducting the electric current from the generator a wire 69 extends therefrom to the tower where it is connected to an automatic switch or conductor mounted on the rotatable standard supporting the housing.

The wind wheel carried by the housing is normally held into the wind or operative position by means of a vane 87 secured to the outer end of a frame comprising converging rods 85 and 86 pivoted to the upper and lower sides of the housing by pintles 84 and connected at intermediate points by vertical plates 88 and 89, said vane and frame carried thereby having a horizontal swinging motion for moving the wind wheel out of operation or with its edge to the wind when said vane is shifted by the wind or manually at right angles to the housing, and for holding the vane yieldingly in longitudinal alignment with the housing for the operation of the wind wheel under normal conditions a spring 90 is connected by ears 91, 92 to the rear end of the housing and plate 88 of the frame supporting the vane. Bumpers 93, 94 on the plate 89 of the vane supporting frame cooperate with bumpers 96 and 97 on the rear end of the housing to reduce the shock of the movable vane when it returns to its normal position, and in order that its movement to position at right angles to the housing will operate the lever 31 for applying the brake to the wind wheel a projection or bumper 95 on the plate 89 engages the bumper 33 on said lever actuating the latter to pull on the rod 28 connected to the bell-crank lever of the brake device, excessive movement of the vane and its frame being prevented by the bumpers 93 and 94 striking bumpers 102, 102 on the housing. The vane is operated manually to throw the wind wheel out of operation by means of a cable 98 attached to the plate 89 of the supporting frame and extending therefrom between guide rollers 100 in a bracket 99 secured to the bottom of the housing and attached to an eye 101 on a spool like collar 71 slidable on the rotatable standard 6 to which it is connected for rotation therewith by spline 80, as shown in Fig. 4, said collar being operated to pull on the cable by means of pull ropes or cables 81 extending through the platforms of the tower to a crosspiece 82 at the bottom of the tower. The pull ropes or cables are connected to the collar through the medium of a yoke 77 loosely mounted on the collar between the upper and lower flanges thereof. The crossbar 82 to which the pull ropes 81 are attached is preferably provided with a downwardly curved loop-handle 83 for convenience in manually operating the yoke, and in order to lift the collar to normal position a weighted lever 83b is connected to the handle by link 83a, the lever being pivoted in the frame of the tower and has an adjustable weight 83c on the outer end thereof. The collar 71 and yoke 77 carry the means for transmitting the current from the rotatable housing to the bottom of the tower, said means in the present instance consisting of a spring-actuated binding post or contact member 70 in the form of a headed pin or vertically movable terminal post to which the wire conductor 69 from the generator is connected, the post passing through an opening 72 in the collar with a spring 75 interposed between a plate 73 at the upper end of the opening and a nut 74 near the lower end of the post. By reference to Figs. 2 and 5 it will be seen that the lower end of the spring-actuated post or electric connector bears on an annular plate 76 fixed to the upper side of the yoke so that this electric connector will transmit the current from the movable part of the apparatus by way of the slidable collar to the stationary part or yoke by which said collar is operated in throwing the windmill in and out of operation manually. The post and annular plate are suitably insulated from the parts to which they are connected so that the current from the generator in the housing will not be grounded through the metal framework of the tower. The electric conductor described is encased in a supplemental housing 10b secured to and depending from the underside of the main housing 10.

By reference to Fig. 1 it will be observed that the electric generator 66 is located at the opposite side of the standard from the wind wheel, and that the other parts of the mechanism carried by the housing are evenly distributed with reference to the rotatable standard in order that the windmill supported thereby may freely turn without exerting uneven pressure on the tower, and that the vane is on a horizontal line, approximately, with the axis of the wind wheel.

In the modification illustrated in Figs. 8 and 9 I provide the windmill as a separate unit and locate the housing for the mechanism which operates the pump rod and electric generator at the bottom of the tower, in this instance the main shaft 109 driven by the wind wheel being mounted in a comparatively small casing or housing 105 at the upper end of a rotatable standard 106, with the shaft supported in bearings 112, 113 suitably supported in the housing. The main shaft is geared to a vertical shaft 114 extending from the windmill by intermeshing gearwheels 127 and 128, the latter carrying one member of a ball bearing 116, the other member of which is at the upper end of the said standard. In this instance also the bearings for the main shaft are lubricated by means of an oil pump 120 located on the bottom of the casing or housing 105 to receive a supply of oil from the bottom of said casing and pump it through pipes 121 to said bearings, the oil pump having a valve 126 in the lower end of the cylinder and a piston 125 operated from the main shaft by an eccentric 122 with the band 123 connected to the pump rod 124. The windwheel is of the construction hereinbefore described with reference to the preferred construction of apparatus, and consequently the hub 110 and brake 111 only are shown, and likewise the vane and its supporting frame with the mechanism for manually operating said vane are the same, with the exception that in this modification the inner ends of the converging bars 85 and 86 are hingedly connected to the rear end of the casing or housing 105.

The vertical shaft 114 rotated by the shaft of the windmill extends downwardly through the tower into a box 131 at one side of a housing 130 which encloses the operating mechanism for the pump and electric generator. This operating mechanism is similar to that hereinbefore described with reference to the preferred embodiment of my invention and comprises a horizontal driving shaft 135 supported in bearings 136 and is geared to the shaft 114 from the windmill by bevel gears 133 and 134, the said driving shaft being geared to an auxiliary shaft 142 by pinions 137 in mesh with large gearwheels 143 at the ends of said auxiliary shaft. Pitman rods 144 are connected to the gearwheels 143 to reciprocate a crosshead 145 which operates the pump rod 146 connected to said crosshead, the latter having slides 165 working on vertical guide posts 166 rising from the bottom of the housing, and for disconnecting the gearwheels 137 from the shaft when it is desired to throw the pump out of operation a clutch member 138 is formed on each gearwheel with which engages a companion clutch member 138a slidably connected by spline to the shaft and operated by a lever 140 having a yoke 139 embracing said slidable clutch member. The levers 140 are pivoted intermediate their ends and for operating these levers they are connected at their outer ends by links 158 to a lever 159 at opposite sides of the fulcrum 160 of said lever, and to hold this clutch operating lever when shifted to engage or disengage the clutches it is provided with the usual sliding rod 161 adapted to engage a toothed quadrant 162. This arrangement of clutch operating mechanism throws the clutches in and out of engagement according to the throw of the lever, as will be obvious. The driving shaft also operates an electric generator 156 supported in a compartment at the other side of the housing from the box 131, for which purpose said driving shaft is extended into the compartment and carries a large gearwheel 149 in mesh with a gearwheel 153 on a stub shaft geared to the motor shaft of the generator by intermeshing gearwheels 154 and 155. The gearwheel 149 is loosely mounted on the driving shaft 135 and connected thereto for operation by means of a clutch 150 having interengaging ratchet teeth, with the slidable member 150a of the clutch actuated to engage and disengage the companion member by means of a pivoted lever 151 connected to the clutch by arm 151a having a yoke embracing the slidable member of said clutch, the lever being provided with the usual sliding pawl 151b engaging toothed segment 151c for holding the clutch in or out of engagement.

The operation of my improved form of combined windmill and electric generator will be readily understood from the foregoing description in connection with the accompanying drawings, for when the vane is in its normal position as shown in Fig. 1 it will act to turn the housing carrying the windmill so as to bring the wind wheel into the wind, and the turning of the main shaft 15 will operate the pumping mechanism and electric generator, in one instance (Fig. 1) directly and in the other instance (Figs. 8 and 9) through the intervention of the vertical shaft 114, the aforesaid driving shaft also operating the oil pump to keep the bearings lubricated. When the generator is located in the housing at the top of the tower the current will be transmitted to the ground by wire 69, binding post 70, and annular plate 76 to which the lead wire 78 is connected, the spring actuated binding post bearing on the annular plate to maintain contact therewith during the turning movement of the standard and housing carried thereby, and of course the electric current may be utilized for lighting a dwelling, barn, and other buildings, and for operating different domestic apparatus, as a churn, saw mill, etc. When it is desired to put the windmill out of operation, as for instance during a storm or in making repairs, the collar 71 is slid down on the standard by pulling on the ropes or cables 81, and this collar operates to swing the vane at right angles to the housing so that the wind wheel will present its edge to the wind. As the vane is swung to one side of the housing the bumper 95 striking the bumper 33 on the brake operating lever 31 will operate the latter so that the brake will be applied to stop the wind wheel and hold it from turning.

I have shown modifications in the construction and arrangement of the mechanism embodying my invention of an apparatus operated by a windmill for pumping water and generating electric current, but it will be understood that further modifications or changes may be made within the spirit and scope of the appended claim.

I claim:

In a combined windmill and electric generator having a housing rotatably mounted at the upper end of a tower, a horizontal shaft extending into the housing, and a wind wheel driving said shaft, of a rotatable standard supporting the housing on the tower, a vane carrying frame pivoted to the rear end of the housing for lateral movement, a helical spring connected to the housing and to the vane carrying frame for holding the latter normally in longitudinal alignment with the housing to position the wind wheel in operative position, a collar slidable on the rotatable standard and connected to the vane carrying frame for manually shifting the latter to put the windmill out of operation, and a yoke loosely connected to the collar and having pull ropes depending therefrom at opposite sides thereof; together with an electric generator in the housing operated from the shaft of the wind wheel, a spring-actuated binding-post mounted in the collar and connected to the generator, an annular plate on the yoke forming a terminal with which said binding-post engages, and a wire conductor leading from said annular plate or terminal for conveying the electric current to the point of consumption.

FRANK VICTORIA.